(12) United States Patent
Wang et al.

(10) Patent No.: US 12,526,094 B1
(45) Date of Patent: Jan. 13, 2026

(54) LIGHTWEIGHT ORTHOGONAL FREQUENCY DIVISION MULTIPLE ACCESS (OFDMA) SCHEDULER FOR LOW LATENCY APPLICATIONS

(71) Applicant: Amazon Technologies, Inc., Seattle, WA (US)

(72) Inventors: Shao-Cheng Wang, Santa Clara, CA (US); QingYun Wei, San Jose, CA (US); Yuanpu Hu, Mountain View, CA (US); Yu-Che Tsai, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 619 days.

(21) Appl. No.: 17/950,936

(22) Filed: Sep. 22, 2022

(51) Int. Cl.
  *H04L 5/00* (2006.01)
  *H04L 1/00* (2006.01)
  *H04R 1/40* (2006.01)
  *H04R 3/12* (2006.01)
  *H04W 84/12* (2009.01)

(52) U.S. Cl.
  CPC .......... *H04L 5/0007* (2013.01); *H04L 1/0003* (2013.01); *H04L 5/0053* (2013.01); *H04R 1/403* (2013.01); *H04R 3/12* (2013.01); *H04R 2420/07* (2013.01); *H04W 84/12* (2013.01)

(58) Field of Classification Search
  CPC ... H04L 5/0007; H04L 5/0053; H04L 1/0003; H04R 1/403; H04R 3/12; H04R 2420/07; H04W 84/12
  See application file for complete search history.

(56) References Cited

U.S. PATENT DOCUMENTS

| | | | |
|---|---|---|---|
| 2017/0373789 A1* | 12/2017 | Huang | H04B 7/0632 |
| 2019/0230674 A1* | 7/2019 | Cheng | H04L 1/00 |
| 2023/0308235 A1* | 9/2023 | Rodriguez | H04R 27/00 |

* cited by examiner

*Primary Examiner* — Kevin C. Harper
*Assistant Examiner* — Salma Ayad
(74) *Attorney, Agent, or Firm* — Eversheds Sutherland (US) LLP

(57) ABSTRACT

An OFDMA scheduling device receives a data stream from a network router and can identify audio packets based on metadata. The OFDMA scheduling device is aware of the number of the wireless devices connected to it, and can determine a resource unit (RU) allocation for each of the wireless devices based on the payload of the wireless devices. The OFDMA scheduling device can also determine a modulation and coding scheme (MCS) for each of the wireless devices based on the received signal strength indicator (RSSI) value and any feedback data received from each of the wireless devices. Based on the RU allocation and MCS determination, the OFDMA scheduling device can send a downlink OFDMA frame to the wireless devices, notifying them of their respective RU allocations and the MCS to be used while receiving audio packets from the OFDMA scheduling device.

18 Claims, 8 Drawing Sheets

LIGHTWEIGHT ORTHOGONAL FREQUENCY DIVISION MULTIPLE ACCESS (OFDMA) SCHEDULER FOR LOW LATENCY APPLICATIONS

BACKGROUND

With the advancements in wireless communication technology, internetworking a number of wireless devices to define a mesh network is now achievable to accomplish previously unavailable features. This internetworking of devices has been referred to generally as the Internet of Things (IoT). An IoT network of wireless devices may communicate over, for example, Wi-Fi® technology.

However, a common problem encountered when using Wi-Fi technology to sustain an IoT network is the physical range limitations in Wi-Fi signal coverage by a single Wi-Fi Access Point (AP). In other words, a single Wi-Fi AP device may not support the range to cover all desired IoT devices to be included in the IoT network when the IoT devices are physically located beyond the range of the single Wi-Fi AP device.

Software-Enabled Access Point (SoftAP) is a common feature in some Wi-Fi chipsets for wireless devices. SoftAP allows a wireless device to host its own Wi-Fi network and act as a bridge, to which other wireless devices can connect.

DESCRIPTION OF THE FIGURES

The present embodiments will be understood more fully from the detailed description given below and from the accompanying drawings of the present disclosure, which, however, should not be taken to limit the present embodiments, but are for explanation and understanding only.

DETAILED DESCRIPTION

Figure 1:
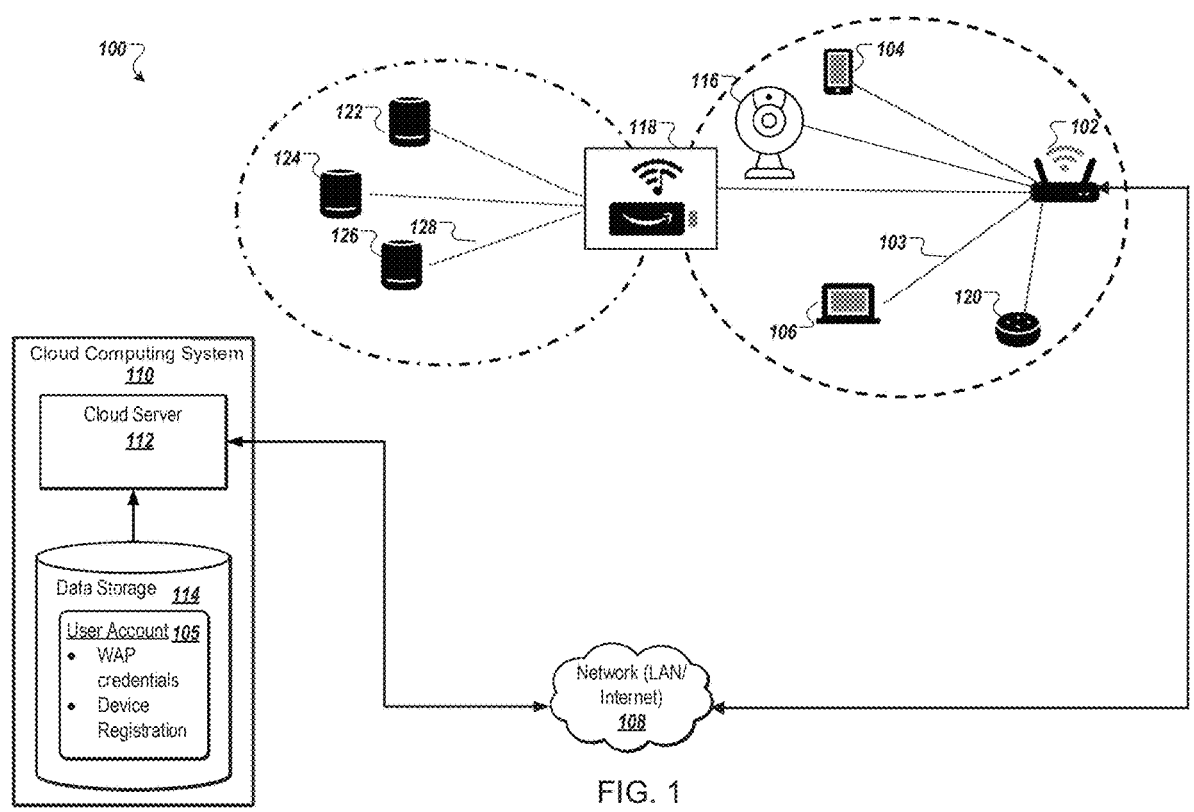
FIG. 1 is a system diagram of an OFDMA scheduling system including a wireless area network (WLAN) group according to one embodiment.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

Currently, some legacy chipsets are unable to support the complex schedulers required by Wi-Fi 6 (IEEE 802.11ax) downlink and uplink orthogonal frequency-division multiple access (OFDMA) feature, and therefore are unable to take advantage of improved network efficiency supported by OFDMA. For example, some home theater systems use a virtual bridge (e.g., softAP wireless architecture) to provide a low-latency Wi-Fi link between a relay device (e.g., an Amazon® Fire TV® stick) and one or more wireless devices (e.g., Amazon® Echo® speakers). However, with increasing congestion in Wi-Fi environments and increasing demand for higher-quality audio codecs, there is a need to upgrade the virtual bridge feature in DL-OFDMA in order to deliver longer audio packets having higher-quality audio codecs with less overhead.

Accordingly, one solution disclosed is a "lightweight" OFDMA scheduling device for scheduling OFDMA frames based on known characteristics of a Wi-Fi link between a relay device and one or more wireless devices. The OFDMA scheduling device (e.g., relay device) connects to one or more wireless devices (e.g., Internet of things (IoT) devices such as smart speakers) on an existing Wi-Fi network. The OFDMA scheduling device receives a data stream (e.g., through a streaming service) from a network router and can identify audio packets based on traffic identifiers (e.g., a type of service identifier) in the data stream's metadata. Since the OFDMA scheduling device is already aware of the number of the wireless devices connected to it, it can determine a resource unit (RU) allocation for each of the wireless speakers based on the payload of the wireless speakers. The OFDMA scheduling device can also determine a modulation and coding scheme (MCS) for each of the wireless speakers based on the received signal strength indicator (RSSI) value and any feedback data received from each wireless speaker. Based on the RU allocation and MCS determination, the OFDMA scheduling device can send a downlink OFDMA frame to the wireless speakers, notifying them of their respective RU allocations and the MCS to be used while receiving audio packets from the OFDMA scheduling device. The wireless devices described herein may include smart speakers, wireless cameras, smartphones, tablet computers, laptop computers, desktop computers, home automation devices, or other smart computing devices that include wireless communication circuitry (e.g., Wi-Fi chip hardware).

FIG. 1 is a system diagram of an OFDMA scheduling system 100 for scheduling OFDMA signals in a wireless local area network (WLAN) group according to one embodiment. The OFDMA scheduling system 100 includes a network router/home wireless access point (WAP) device 102. The home WAP device 102 is connected to a cloud computing system 110 over a network 108. The network 108 can include one or more public or private networks, such as the Internet. The home WAP device 102 can be a standalone product or can be integrated into a modem, a router, a switch, a wireless network device, or any combination thereof, to provide access to the cloud computing system 110 via a LAN or Internet access. For example, the home WAP device 102 can be hard-wired or otherwise connected to a cable modem that provides the LAN and Internet access.

The cloud computing system 110 can include one or more cloud servers 112, one or more data storage devices 114, as well as other resources. The cloud server 112 provides a cloud service that can securely store WAP credentials associated with a home WAP device (e.g., SSID of the home WLAN and passphrase), device registration information, or the like. The network router/home WAP device 102 includes at least one WLAN radio (e.g., Wi-Fi® radio) that operates at 2.4 GHz, 5 GHZ, 6 GHZ, or all three frequencies.

The OFDMA scheduling system 100 includes an OFDMA scheduling device 118 that includes at least one WLAN radio (e.g., Wi-Fi® radio) that operates at 2.4 GHz, 5 GHz, 6 GHZ, or all three frequencies. The OFDMA scheduling device 118 may include a memory that stores instructions or program modules that are executable by one or more processors. The home WAP device 102 can be connected to the OFDMA scheduling device 118 and one or more client stations 104, 106, 116, 120 via the home WLAN 103. The OFDMA scheduling device 118 may implement a mesh network by creating a virtual bridge (softAP) on the OFDMA scheduling device for relaying data packets between the wireless devices 122, 124, 126 and the network router/home WAP device 102. For example, the OFDMA scheduling device 118 may create a mesh network 128 to operate in an IP layer (network Layer-3 by ISO OSI model's seven-layer networking definition) to simulate a MAC layer (data link Layer-2) mesh network, thereby creating a virtual bridge (e.g., softAP) to support a mesh network and also works seamlessly with any home Wi-Fi AP routers by using Layer-3 techniques to simulate a Layer-2 bridge. With this virtual bridge, Wi-Fi chipsets with integrated special Wi-Fi MAC Layer-2 mesh network support, or external gateway hubs, are not required. To accomplish this solution, the OFDMA scheduling device 118 may be designated as a relay device that communicates with a home AP router and also operates as a relay to the remaining client wireless devices (client stations/nodes) 122, 124, 126. Each of the wireless devices (relay device, client station) may be a station device with the capability to use certain known Wi-Fi protocols such as 802.11. The technical solution also achieves the virtual bridge by creating two networks that operate within the same IP sub-network to achieve a "zero-configuration" for an end-user of the mesh network where the relay device is otherwise transparent between the client stations and the home AP router. The two networks include a first physical network between the relay device and the home AP router, and a second physical network between the relay device and its client stations.

In one embodiment, the OFDMA scheduling device 118 receives a data stream (e.g., through a streaming service) from a network router/home WAP device 102. The data stream may contain audio data, video data, image data, or a combination thereof. The OFDMA scheduling device 118 identifies audio packets in the data stream based on traffic identifiers (e.g., a type of service identifier) in the data stream's metadata. For example, the data stream may include metadata having a type of service tag, which may indicate to the scheduler that the data stream includes audio packets. In Wireless LAN, packets can be a stream of video, voice, or data, and each type of data packet has different priority to be served by the OFDMA scheduling device 118. Traffic Identifier (TID) is an identifier used to classify a packet in Wireless LAN. When the OFDMA scheduling device 118 receives an 802.11 frame with TID set for audio, for example, the priority is given higher than a data frame for best effort purpose. TID is part of a quality of service (QOS) concept in Wireless LAN introduced by the Institute of Electrical and Electronics Engineers in 802.11e as part of 802.11 standards family. It is represented as a four-bit number (0-3) identifying a QoS traffic within MAC data service. There are 16 possible values for TID, out of which only 8 are practically usable to identify different services.

The TID subfield is contained in certain MAC frames. The presence of QOS, thus the presence of TID, is determined by the value set in the most significant bit (MSB) of subtype field (bit b7) of Frame control field. A QoS-enabled MAC layer of 802.11 protocol stack uses the TIDs to classify and prioritizes processing of incoming and outgoing frames. Since the OFDMA scheduling device 118 is aware of the number of the wireless devices (e.g., smart speakers) 122, 124, 126 connected to it based on the number of device on the mesh network 128, the scheduler can determine a resource unit (RU) allocation for each of the wireless devices based on the payload of the wireless devices 122, 124, 126. With OFDMA, the channel bandwidth is divided into resource units (RUs) of various sizes. The size of an RU can vary from the smallest 26 subcarriers (or 2 MHz) up to 996 tones (or 77.8 MHz). The size and the location of the RUs is defined for 20 MHz, 40 MHz, 80 MHz channels, and 80+80 or 160 MHz channels. A resource unit (RU) may include data subcarriers used to carry data information and form the majority of the subcarrier's assignment, pilot subcarriers used for phase tracking for channel estimation, DC subcarriers at the center frequency of the channel, and a guard band/null subcarriers used at the band edges to protect from interference from neighboring RUs. Different numbers and sizes of RUs can be allocated for transmissions to different users, based on how much data each station needs. The OFDMA scheduling device 118 is responsible for RU assignment and coordination. For example, applications that require a lot of data, like streaming video, can be assigned a large RU, while applications that require very little data can be assigned a small RU. Each RU can use a different modulation and coding scheme (MCS) and level, and RU assignments can vary on a frame by frame basis.

The OFDMA scheduling device 118 also determines a modulation and coding scheme (MCS) for each of the wireless devices 122, 124, 126 based on the received signal strength indicator (RSSI) value and any feedback data received from each of the wireless devices 122, 124, 126. Based on the RU allocation and MCS determination, the OFDMA scheduling device 118 sends a downlink OFDMA frame to the wireless devices 122, 124, 126, notifying them of their respective RU allocations and the MCS to be used while receiving audio packets from the OFDMA scheduling device 118. For a downlink transmission, a high-efficiency (HE) multi-user (MU) physical layer protocol data unity (PPDU) carrying a mixture of 26-, 52-, 106-, 242-, 484-, and 996-tone RUs is transmitted from the OFDMA scheduling device 118 to the wireless devices 122, 124, 126. The high-efficiency (HE) multi-user (MU) physical layer protocol data unity (PPDU) preamble is transmitted over the whole channel and contains a field called the SIG-B that provides information to the stations about their RU size and frequency allocation, the modulation MCS, and the number of spatial streams allocated by the OFDMA scheduling device 118. The HE-SIG-B field is only included in HE MU PPDU (downlink) and it includes the information for OFDMA and MU-MIMO resource allocation. The HE-SIG-B field includes a common field followed by user specific fields. The common field of an HE-SIG-B content channel contains information regarding the RU assignment, the RUs allocated for MU-MIMO and the number of users in MU-MIMO allocations. The SIG-B user specific fields contain information for all users in the PPDU on how to decode their payload.

The wireless devices (client stations) 122, 124, 126 can be any electronic device that includes a wireless interface, such as a Wi-Fi® radio chipset that permits the electronic device to wirelessly connect to the OFDMA scheduling device 118 and the home WAP device 102.

The client stations can include various components, such as one or more processors (e.g., a host processor or central processing unit (CPU), one or more graphics processors, input-output (I/O) devices, memory devices, storage devices, or the like. The client stations can be an Internet of Things (IoT) device, a portable computing device, or other user devices. The client station 104 can be a content rendering device that includes a modem for connecting the user device to a network, electronic book readers, portable digital assistants, mobile phones, laptop computers, portable media players, tablet computers, cameras, video cameras, netbooks, notebooks, desktop computers, gaming consoles, Blu-ray® or DVD players, media centers, drones, audio-input-enabled devices, speech-based personal data assistants, voice control and speaker devices, smart switches, smart bulbs, remotes, televisions, television set-top boxes, television dongles, or the like. The client stations may also be an audio-input-enabled device, such as the Amazon Echo device, developed by Amazon Technologies, Inc. of Seattle, WA. Alternatively, the client stations may be a set-top box (STB) or other media streaming device. The client stations can connect to one or more different types of cellular networks, personal area networks (PANs) in addition to the WLAN (e.g., Wi-Fi® networks).

The client stations include a circuit board, such as a printed circuit board (PCB) upon which one or more of the components described above is disposed. The components can be integrated into one or more integrated circuits. In some embodiments, the components can separate integrated circuits or chipsets. In other embodiments, the components can reside on a common carrier substrate die of an integrated circuit. For example, the client stations can include a processing element, one or more radios, including a baseband processor and RF front-end circuitry. The baseband processor is operable to generate RF signals to radiate electromagnetic energy via one or more antennas. In some cases, the baseband processor and other circuitry can be implemented in an RF module, such as a chipset implementing the Wi-Fi® technology. In addition to the baseband processor, the client stations can also include an application processor (AP) that implements other operations of the client station. In another embodiment, an application-specific integrated circuit (ASIC), a field-programmable gate array (FPGA), or other mixed-signal integrated circuits may be used to implement the operations described herein. In one embodiment, the baseband processor includes one or more transceivers that can operate at 2.45 GHZ, 5 GHZ, and/or 6 GHz. The baseband processor can implement the Wi-Fi® technology. It should be noted that the Wi-Fi® technology is the industry name for wireless local area network communication technology related to the IEEE 802.11 family of wireless networking standards by Wi-Fi Alliance. For example, a dual-band WLAN RF transceiver allows an electronic device to exchange data or connection to the Internet wireless using radio waves in two WLAN bands (2.4 GHz band, 5 GHz band) via one or multiple antennas. For example, a dual-band WLAN RF transceiver includes a 5 GHz WLAN channel and a 2.4 GHz WLAN channel. The WLAN radio may include additional transceivers that operate in the 2.45 GHZ, 5 GHZ, or both. A PAN module includes a transceiver that also operates at 2.4 GHz and may implement the Bluetooth® technology or the Zigbee® technology. The WLAN radio and PAN radio can be individual chipsets, even chipsets provided by different vendors. The WLAN radio and the PAN radio may be implemented in the same chipset or on a common carrier substrate with a processing device, such as in a System on Chip (SoC) architecture. In another embodiment, other wireless RF radios may be used to implement other technologies, such as the LTE technology, or the like. For example, the RF circuitry may include other radios, such as a wireless area network (WAN) radio, PAN radio, GNSS radio (e.g., global positioning system (GPS) radio), or the like. In other embodiments, the antenna architecture may include additional RF radios and/or other communication modules, such as a WLAN radio, a GPS receiver, a near field communication (NFC) radio, an amplitude modulation (AM) radio receiver, a frequency modulation (FM) radio receiver, a PAN radio (e.g., Bluetooth® radio, Zigbee® radio), a GNSS receiver, or the like. The RF circuitry may also include receivers and/or transmitters, filters, amplifiers, mixers, switches, and/or other electrical components. The RF circuitry may be coupled to a modem that allows the user device to handle both voice and non-voice communications (such as communications for text messages, multi-media messages, media downloads, web browsing, etc.) with a wireless communication system. The modem may provide network connectivity using any type of digital mobile network technology including, for example, LTE, LTE advanced (4G), CDPD, GPRS, EDGE, UMTS, 1×RTT, EVDO, HSDPA, WLAN (e.g., Wi-Fi® network), etc. In the depicted embodiment, the modem can use the RF circuitry to radiate electromagnetic energy on the antennas to communicate data to and from the user device in the respective frequency ranges. In other embodiments, the modem may communicate according to different communication types (e.g., WCDMA, GSM, LTE, CDMA, WiMAX, etc.) in different cellular networks. It should be noted that radiation enables the functionality of both transmission and receiving data using reciprocity. It should also be noted that the OFDMA scheduling device 118 can also be considered a client station with respect to the home WAP device 102. The client stations can also be configured to operate as an OFDMA scheduling device as well.

Figure 2:
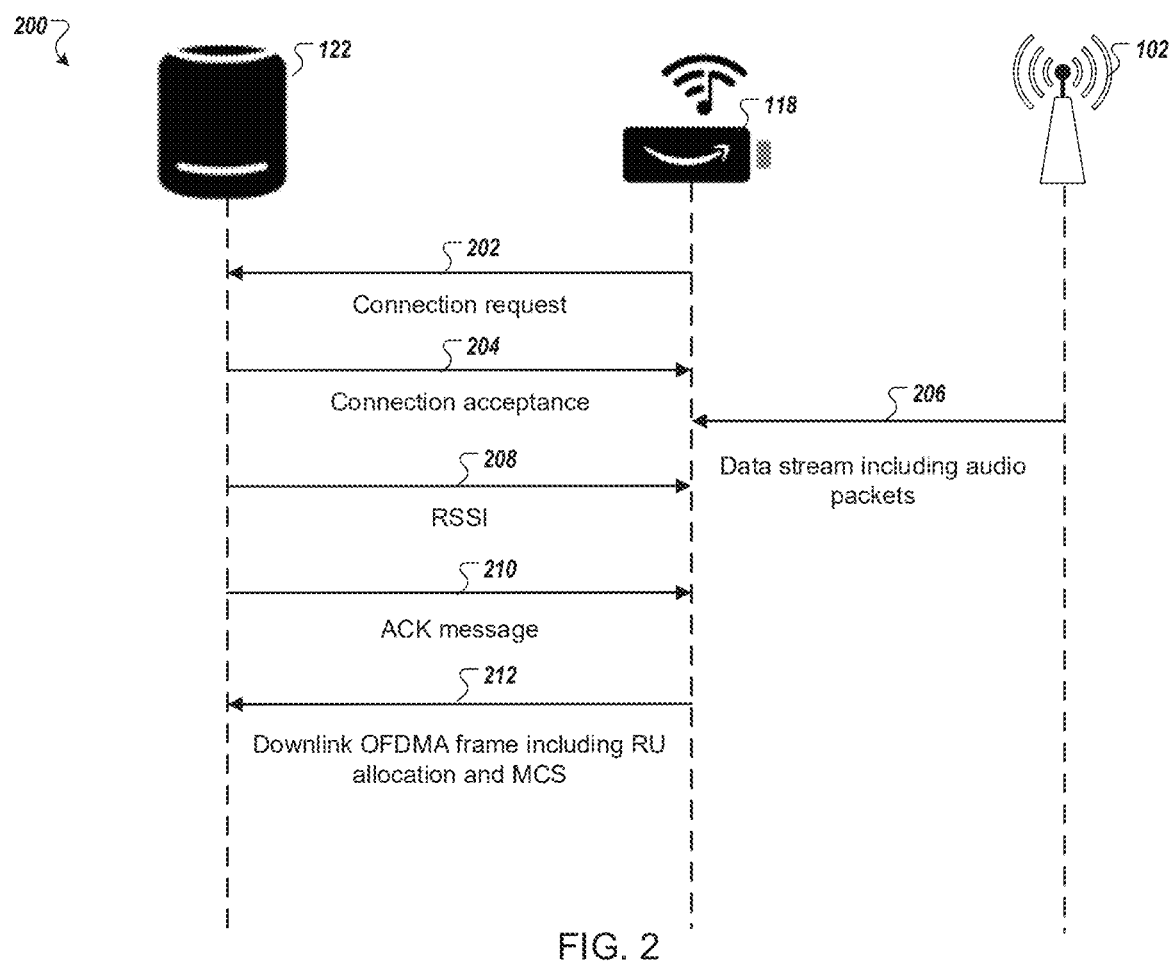
FIG. 2 is a sequence diagram of an OFDMA scheduling procedure between a station (STA) client, relay device, and a wireless access point according to one embodiment.

FIG. 2 is a sequence diagram of an OFDMA scheduling procedure 200 between a client station (STA), relay device, and a wireless access point according to one embodiment. In this example, the relay device can be the OFDMA scheduling device 118, the client STA can be the one or more wireless devices (e.g., wireless speakers) 122, and the wireless access point can be the network router/home WAP device 102. At operation 202, the OFDMA scheduling device 118 sends a connection request to the one or more wireless devices 122 and receives a connection acceptance message from one or more wireless devices 122, 124, 126. This may be performed via a smartphone application or a browser application that recognizes both the OFDMA scheduling device 118 and the wireless devices 122. In one example, the devices may be grouped together and connected to each other using the Alexa® application on a smartphone. When the connection has been established, the wireless devices 122 may send a connection acceptance message to the OFDMA scheduling device 118, at operation 204. At operation 206, the OFDMA scheduling device 118 may receive a data stream from the network router/home WAP device 102. The data stream may be accessed using a streaming service that users can access on an electronic device (e.g., a television (TV), tablet, or computer) or the data may be accessed from a local memory of the electronic device or any memory coupled to the electronic device (wired or wirelessly). The OFDMA scheduling device 118 identifies the presence of audio packets in the data stream using traffic identifiers (e.g., a type of service identifier) in the data stream, and determines the resource unit (RU) allocation based on the payload to each of the wireless devices 122 and the number of wireless devices connected to the OFDMA scheduling device 118. Because multiple wireless devices are intended as recipients in downlink OFDMA, the OFDMA scheduling device 118 coordinates which RUs are assigned to which wireless devices, and how those RU assignments are organized in the frequency domain. The SIG-B field in the HE MU PPDU contains two subfields used for this purpose. The first one is a common field which is used to communicate how RUs are organized within the channel, using an 8-bit binary code. The common field also contains subfields for communicating the use of the center 26-tone RU in 80 and 160 MHz channels, as well as subfields for the CRC and tail. The second one is a user-specific field where per-STA information is held (STA-ID (device ID), MCS, etc.). For example, an OFDMA scheduling device using a 20 MHz channel has data for four OFDMA wireless devices. In the RU allocation subfield of the common field within the SIG-B field of the HE MU PPDU, it sends 00111000, meaning that the channel will be sub-divided into four RUs: Two 52 tone RUs, a 26 tone RU, and one 106 tone RU. The user specific field of the HE MU_PPDU would further specify which STA is assigned to each RU, along with the client station identifier (STA-ID), number of spatial streams used, whether transmit beamforming applies, the MCS, etc.

In Wireless LAN, packets can be a stream of video, voice, or data, and each type of data packet has different priority to be served by the OFDMA scheduling device 118. Traffic Identifier (TID) is an identifier used to classify a packet in Wireless LAN. When the OFDMA scheduling device 118 receives an 802.11 frame with TID set for audio, for example, the priority is given higher than a data frame for best effort purpose. TID is part of a quality of service (QOS) concept in Wireless LAN introduced by the Institute of Electrical and Electronics Engineers in 802.11e as part of 802.11 standards family. It is represented as a four-bit number (0-3) identifying a QoS traffic within MAC data service. There are 16 possible values for TID, out of which only 8 are practically usable to identify different services.

The TID subfield is contained in certain MAC frames. The presence of QoS, thus the presence of TID, is determined by the value set in the most significant bit (MSB) of subtype field (bit b7) of Frame control field. A QoS-enabled MAC layer of 802.11 protocol stack uses the TIDs to classify and prioritizes processing of incoming and outgoing frames. With OFDMA, the channel bandwidth is divided into resource units (RUs) of various sizes. The size of an RU can vary from the smallest 26 subcarriers (or 2 MHZ) up to 996 tones (or 77.8 MHz). The size and the location of the RUs is defined for 20 MHz, 40 MHZ, 80 MHz channels, and 80+80 or 160 MHz channels. A resource unit (RU) may include data subcarriers used to carry data information and form the majority of the subcarrier's assignment, pilot subcarriers used for phase tracking for channel estimation, DC subcarriers at the center frequency of the channel, and a guard band/null subcarriers used at the band edges to protect from interference from neighboring RUs. Different numbers and sizes of RUs can be allocated for transmissions to different users, based on how much data each station needs. The OFDMA scheduling device 118 is responsible for RU assignment and coordination. For example, applications that require a lot of data, like streaming video, can be assigned a large RU, while applications that require very little data can be assigned a small RU. Each RU can use a different modulation and coding scheme (MCS) and level, and RU assignments can vary on a frame by frame basis.

At operation 208, the OFDMA scheduling device 118 may receive received signal strength indicator (RSSI) value from each of the wireless devices 122. The RSSI value represents a signal strength associated with the wireless connection between two devices, such as between the router and the OFDMA scheduling device 118 or between the OFDMA scheduling device 118 and the wireless devices. In another embodiment, the RSSI value represents the wireless connection between the router and the wireless devices. At operation 210, the OFDMA scheduling device 118 may also receive channel state information (CSI) and acknowledgment (ACK) messages acknowledging receipt of data frames from the wireless devices 122. CSI data includes information about the channel properties of a channel between devices. It can be measured at the wireless speakers 122 and communicated back to the OFDMA scheduling device 118 to be used for channel estimation. CSI information describes how a signal propagates from the transmitter to the receiver and represents the combined effect of, for example, scattering, fading, and power decay with distance. The OFDMA scheduling device 118 can determine the modulation and coding scheme (MCS) for each of the wireless devices based on the smallest RSSI value and feedback (e.g., an ACK message) received from the wireless devices 122. At operation 212, the OFDMA scheduling device 118 sends a downlink OFDMA frame, including the RU allocation and an indication of the MCS, to each of the wireless devices 122. Modulation Coding Scheme (MCS) are selected based on several parameters of a Wi-Fi connection between two client stations. For OFDMA, it depends on the modulation type, the coding rate, the number of spatial streams, the channel width, and the guard interval. Modulation type is the phase and amplitude modulation for bit encoding. More advanced modulations (e.g., 256 QAM) transfer more information, but they are also more susceptible to noise. Coding rate is how many bits transfer information and how many are used for error correction. Higher values (e.g. 5%) transfer more information, but there is less room for error correction. Spatial streams show how many independent data streams are used. Higher values (e.g., 4 streams) increase data rates, but are susceptible to noise and interference. Channel width is the size of the channel used for the communication. Wider channels can achieve higher bandwidth, but doubling the channel width increases the noise floor by 3 dB, which decreases signal-to-noise ratio (SNR). Guard interval is the pause between each packet transmission. Short pauses allow the transmission of more packets, but increase the chances of interference. An MCS table is a lookup table that can be used by the OFDMA scheduling device 118 to determine MCS based on the least RSSI, and negotiate data rate between two client stations once all the connection parameters are known. The MCS table may include, for example, the number of spatial streams (e.g., 0-9), the available modulation schemes (e.g., BPSK, QPSK, 16-QAM, 64-QAM, 256-QAM, 512-QAM, 1024-QAM, etc.), coding rate (e.g., ½, ¾, ⅔, ⅝), data rate (e.g., 800 ns or 400 ns), minimum signal-to-noise ratio (SNR), and RSSI from each wireless device. For each possible combination of modulation, coding rate, number of spatial streams, channel width, and guard interval, there is a unique MCS index. For example, for 2 spatial streams, and an 80 MHz channel, to get an MCS of 5 one needs at least 24 dBM of SNR or −60 RSSI. In one embodiment, the MCS table may be stored in a memory (volatile or non-volatile) of the OFDMA scheduling device 118, and in at least one embodiment, different MCSs can be selected for different sets of wireless devices.

For a downlink transmission, a high-efficiency (HE) multi-user (MU) physical layer protocol data unity (PPDU) carrying a mixture of 26-, 52-, 106-, 242-, 484-, and 996-tone RUs is transmitted from the OFDMA scheduling device 118 to the wireless devices 122, 124, 126. The high-efficiency (HE) multi-user (MU) physical layer protocol data unity (PPDU) preamble is transmitted over the whole channel and contains a field called the SIG-B that provides information to the stations about their RU size and frequency allocation, the modulation MCS, and the number of spatial streams allocated by the OFDMA scheduling device 118. The HE-SIG-B field is only included in HE MU PPDU (downlink) and it includes the information for OFDMA and MU-MIMO resource allocation. The HE-SIG-B field includes a common field followed by user specific fields. The common field of an HE-SIG-B content channel contains information regarding the RU assignment, the RUs allocated for MU-MIMO and the number of users in MU-MIMO allocations. The SIG-B user specific fields contain information for all users in the PPDU on how to decode their payload.

Figure 3:
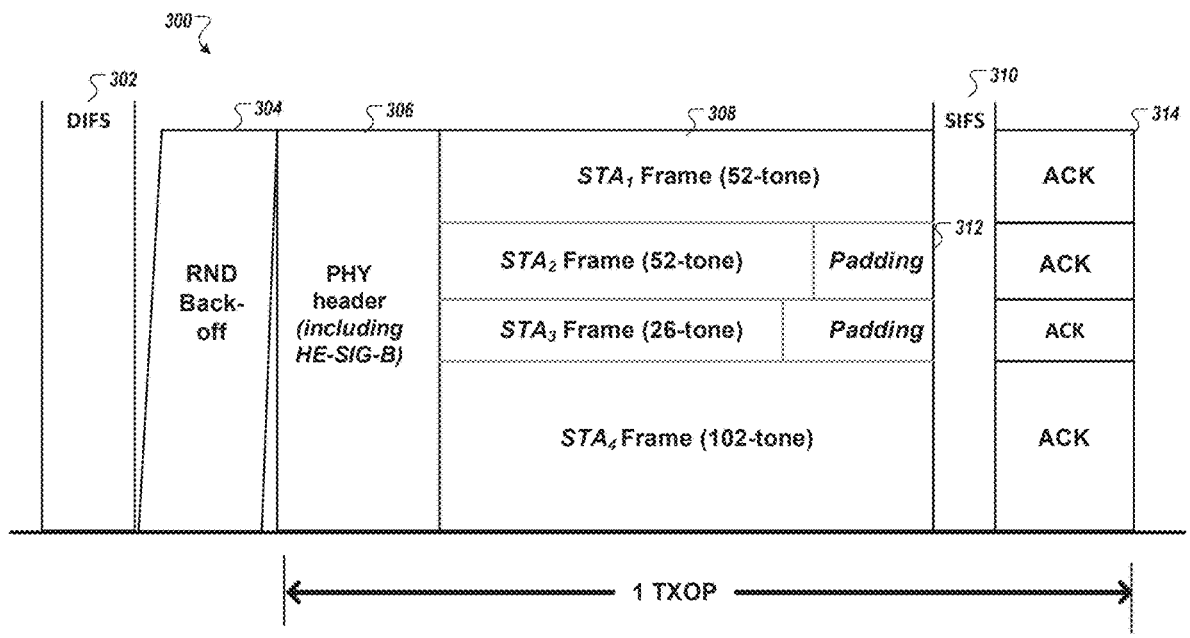
FIG. 3 illustrates an example downlink OFDMA frame in an OFDMA scheduling system according to one embodiment.

FIG. 3 illustrates an example downlink OFDMA frame 300. The OFDMA scheduling device 118 may contend with the wireless devices 122, 124, 126 to get access to the channel using legacy distributed coordinated function (DCF) and enhanced distributed channel access (EDCA) mechanism. Upon winning the contention and expiration of a distributed inter-frame spacing (DIFS) period 302, the OFDMA scheduling device 118 sends the data frame 300 with a legacy physical (PHY) header 306 as well as an IEEE 802.11ax specific header named high-efficiency signal (HE-SIG-B), which specifies the downlink (DL) OFDMA schedule and RU allocation 308. Each RU allocation includes a set of tones (e.g., 26, or 52, or 106 tones) assigned to each of the stations/wireless devices 122. Some RU allocations 308 may optionally include padding bits 312. In 802.11ax, backward compatibility has to be maintained with non-OFDMA capable client STAs. This means that communication can not only be aligned in the frequency domain, but also in the time domain-meaning that client STAs share the same time allocation. Legacy (OFDM) STAs may still contend for the channel using carrier sense multiple access (CSMA). Supposing that a client STA participating in a downlink OFDMA transmission was set to receive more data than the others, if the RF energy dropped to near the noise floor in the other RUs as data transmission ended, it is reasonable to imagine that a legacy STA might not detect enough energy on the channel near the end of the time allocation and begin to transmit, causing a collision. OFDMA client STAs are allowed to aggregate frames to fill the time slot, as well as employ fragmentation, but this still does not prevent mismatched ending of data transmission among client STAs. In order to avoid a potential collision in this scenario, padding bits 312 must be transmitted at the same transmit power as the data bits though the end of the time allocation. Additionally, the automatic gain control settings of each receiver is derived based on the initial transmissions over the entire bandwidth, i.e., the preambles. During the course of the MU transmissions a sudden drop in power of one of the transmissions shall affect the decoding of the bits going in another RU as power is not changed during a PPDU. This may complicate PHY decoding of PPDUs coming in different RUs. Consequently, it is safer to maintain the same power levels for the entire HE-MU-PPDU duration by suitable padding bits 312 for all users irrespective of their data size. In some cases, the OFDMA scheduling device 118 may experience a collision on the network and wait for a fixed amount of time before attempting to retransmit. Such random backoff 304 minimizes the probability that the same nodes will collide again. Upon receiving the high-efficiency signal (HE-SIG-B) header, the wireless devices learn which RUs are assigned to them, and if there is a transmission assigned for them. The STAs wait for a short inter-frame spacing (SIFS) duration 310 at the end of the data transmission and participate in the MU-ACK (acknowledgment) action based on their ACK policy. In the MU-ACK action, each STA that is required to send an ACK frame 314 through the RU 308 allocated for its ACK frame 314 transmission in the uplink (UL) direction.

Figure 4:
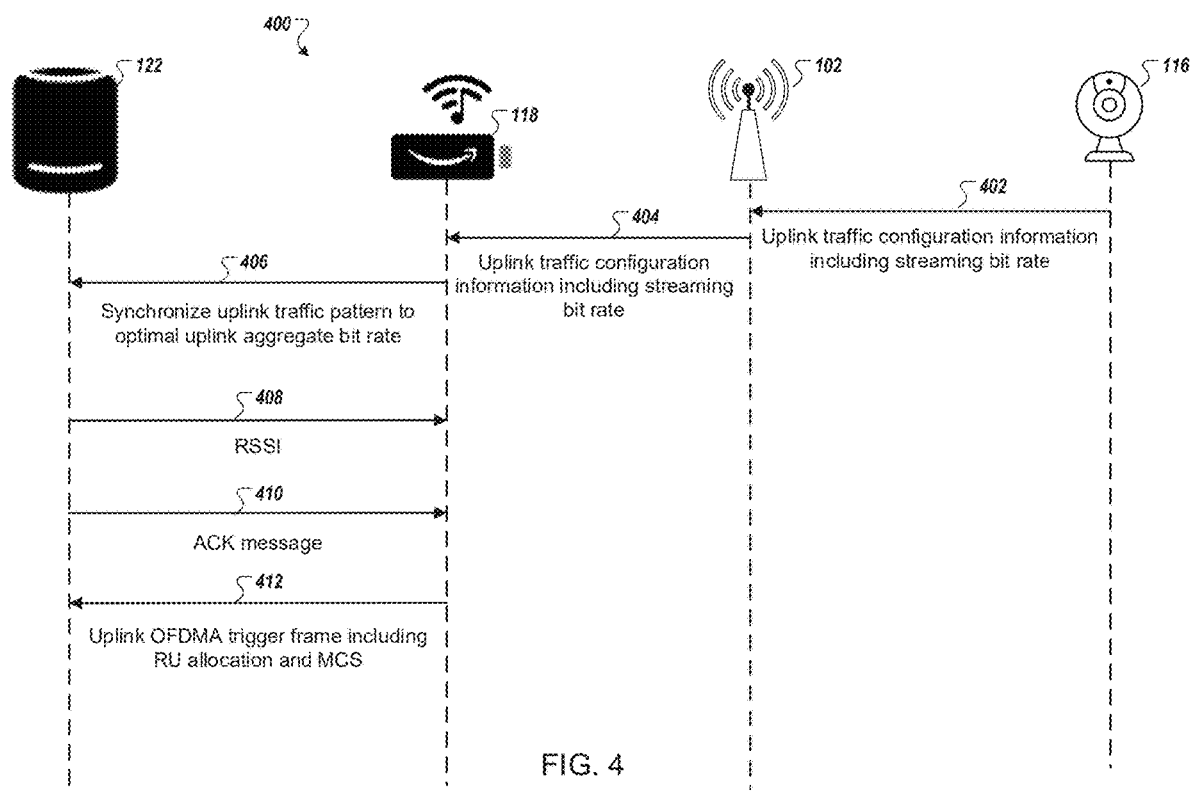
FIG. 4 is a sequence diagram of an OFDMA scheduling procedure between a station (STA) client, a wireless access point, a relay device, and another (STA) client, according to one embodiment.

FIG. 4 is a sequence diagram of an OFDMA scheduling procedure 400 between a client station (STA), a wireless access point, a relay device, and another client station (STA), according to one embodiment. In this example, the virtual bridge (e.g., softAP) can be upgraded with uplink OFDMA to support simultaneous upload traffic from multiple wireless devices 116 (e.g., security cameras) and RU allocation for uplink data, and the following paragraphs describe how to determine where in the channel a specific client device is transmitting during a transmit opportunity. One example is where an OFDMA scheduling device 118 is connected to multiple wireless devices 116 through network router/home WAP device 102. The OFDMA scheduling device 118 can be connected to the wireless devices 116 via a physical link, via the Wi-Fi network, or via the cloud server. The OFDMA scheduling device 118 can determine the bandwidth and streaming bit rate of each of the wireless devices 116 (e.g., security cameras) using one or more layers of the Wi-Fi network (e.g., using packet sniffing or Wi-Fi layer scan). Alternatively, the OFDMA scheduling device 118 and the wireless devices 116 may have the same/shared credentials saved on the cloud server such that the OFDMA scheduling device 118 can access device configuration settings for the security cameras. At operation 402, the OFDMA scheduling device 118 receives uplink traffic configuration information, including streaming bit rates for each of the wireless devices 116. At operation 404, this information is routed to the OFDMA scheduling device 118 via the network router/home WAP device 102. At operation 406, the OFDMA scheduling device 118 determines an uplink aggregate bit rate based on the streaming bit rates of the wireless devices 116, and sends an uplink OFDMA trigger frame instructing the wireless devices to synchronize respective uplink traffic patterns to the uplink aggregate bit rate. For example, the uplink aggregate bit rate can be set to the lowest streaming bit rate of all the wireless devices 116. In one embodiment, the uplink aggregate bit rate can be set to an average or median of streaming bit rates of all the wireless devices 116.

A Wi-Fi channel is made up of tightly spaced subcarriers, or tones, which can be used to modulate data, used as pilot tones, or used as guard bands. With OFDM, a single station at a time would contend for and win a transmit opportunity (TxOp), and occupy the entire channel width even if it didn't need it. In an OFDM 20 MHz wide channel, there are 64 subcarriers-52 of which can be used for data. With OFDMA, the number of subcarriers increased by a factor of four to 256, but the spacing between them also decreased by a factor of four, maintaining the channel width. OFDMA organizes data subcarriers into RUs for both uplink and downlink transmission, so that when multiple Wi-Fi 6 client devices are associated to a Wi-Fi 6 BSSID, each client device can use a different RU instead of the entire channel which facilities the frequency multiplexing that allows for simultaneous channel access. The minimum RU size is 26 tones, and 52, 106, and 242 tone RUs are available as well with 20 MHz channel widths. 40 MHz wide channels offer a maximum RU size of 484 tones, and 80 and 160 MHz channel widths additionally allow for a 996 tone RU. On a 20 MHz channel, using the smallest 26 tone RUs, up to nine client devices could simultaneously send or receive at the same time (with 2 MHz of channel bandwidth each). The OFDMA scheduling device 118 makes the decision about how to allocate RUs to client devices, as well as which RU size to allocate to each client device, and these can change from TxOp to TxOp.

Once RUs are allocated, assignments are communicated to client devices in either the HE MU PPDU for downlink communication, or in a trigger fame to coordinate uplink communication. A client station identifier (STA_ID) is assigned by the OFDMA scheduling device 118 at association, followed by the RU allocation, coding type (BCC or LDPC), and the MCS the client STA should use to transmit the PPDU. For example, an OFDMA scheduling device wins the TxOp, and issues a trigger frame to initiate uplink OFDMA communication on a 40 MHz channel from three associated Wi-Fi 6 clients. Referring to the 40 MHz RU allocation, Client 1 can be assigned a 242 tone (20 MHz) RU on the lower half of the channel. Client 2 and Client 3 can each be assigned an 8 MHz RU on the upper half of the channel.

In the uplink transmission, the OFDMA scheduling device 118 acts as an operations and transmission coordinator. First, the OFDMA scheduling device 118 sends a trigger frame to all the client stations that are involved in the upcoming transmission, and then these stations transmit simultaneously on their respective RUs in response to the trigger frames. Based on the trigger frame, the client station may need to tune its timing, frequency and power levels to participate in this transmission. Client stations participating in an OFDMA transmission must transmit within 400 ns of each other. In order to synchronize the clients, the OFDMA scheduling device 118 transmits a trigger frame. This frame contains information about the OFDMA sub-carrier's RU assigned to each station. In response, the participating clients need to start transmission of the uplink signal after a specified time interval short inter-frame space (SIFS) of 16 μs+/−400 ns after the end of the trigger frame as mandated by the 802.11ax standard. To prevent inter-carrier interference (ICI) between the clients transmitting simultaneously, all client stations participating in the transmission need to pre-compensate for carrier frequency offset (CFO). The client stations adjust their carrier frequency based on the trigger frame received from the OFDMA scheduling device 118.

At operation 408, the OFDMA scheduling device 118 may receive received signal strength indicator (RSSI) value from each of the wireless devices 116. At operation 410, the OFDMA scheduling device 118 may also receive an acknowledgment (ACK) message acknowledging receipt of a data frame from the wireless devices 116. The OFDMA scheduling device 118 can determine the modulation and coding scheme (MCS) for each of the wireless devices based on the RSSI value and feedback (e.g., an ACK message) received from the wireless devices 116. At operation 412, the OFDMA scheduling device 118 sends an uplink OFDMA trigger frame, including the RU allocation and the MCS, to each of the wireless devices 116. Wireless devices 116 participating in an OFDMA transmission must transmit within 400 ns of each other. In order to synchronize the wireless devices 116, the OFDMA scheduling device 118 transmits a trigger frame. This frame contains information about the OFDMA sub-carrier's RU assigned to each wireless device 116. In response, the participating wireless devices 116 need to start transmission of the uplink signal after a specified time interval short inter-frame space (SIFS) of 16 μs+/−400 ns after the end of the trigger frame as mandated by the 802.11ax standard. To prevent inter-carrier interference (ICI) between the wireless devices 116 transmitting simultaneously, all wireless devices 116 participating in the transmission need to pre-compensate for carrier frequency offset (CFO). The wireless devices 116 adjust their carrier frequency based on the trigger frame received from the OFDMA scheduling device 118. When traffic is transmitted between the OFDMA scheduling device 118 and wireless devices 116 that are located at various distances, power control is needed to ensure that wireless devices 116 closer to the OFDMA scheduling device 118 do not drown out user devices farther from the OFDMA scheduling device 118 that are transmitting simultaneously. The 802.11ax standard requires the wireless devices 116 to adjust their power based on the estimated path loss to the OFDMA scheduling device 118. Devices closer to the OFDMA scheduling device 118 transmit less power while devices farther away transmit more power to achieve the same received power at OFDMA scheduling device 118 receiver considering the path loss. There are two classes of devices based on how accurately they can control their power. Class A devices control their transmit power within ±3 dB and class B devices control their power within ±9 dB.

Figure 5:
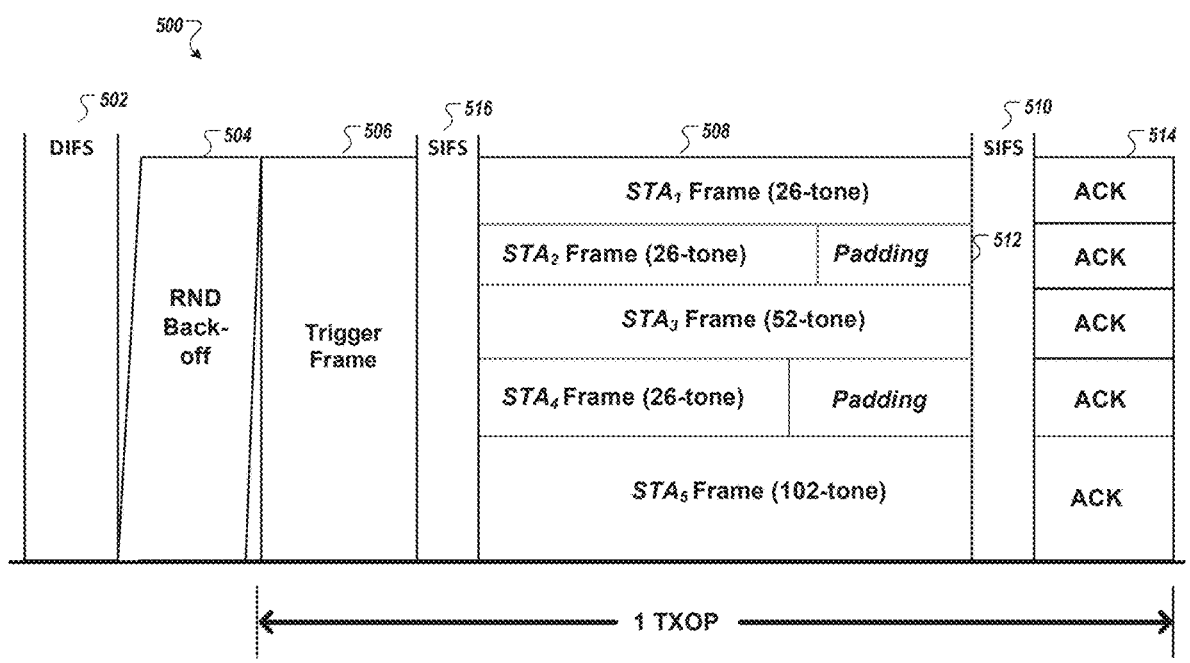
FIG. 5 illustrates an example uplink OFDMA frame in an OFDMA scheduling system according to one embodiment.

FIG. 5 illustrates an example uplink OFDMA frame 500. The OFDMA scheduling device 118 may contend with the wireless devices 116 to get access to the channel using legacy distributed coordinated function (DCF) and enhanced distributed channel access (EDCA) mechanism. Upon winning the contention and expiration of a distributed inter-frame spacing (DIFS) period 502, the OFDMA scheduling device 118 sends the trigger frame 506 with a legacy physical (PHY) header as well as an IEEE 802.11ax specific header high-efficiency signal (HE-SIG-B), which specifies the uplink (UL) OFDMA schedule and RU allocation 508. Each allocation includes a set of tones (e.g., 26, or 52, or 106 tones) assigned to each of the client stations/wireless devices 116. Some RU allocations 508 may optionally include padding 512. In some cases, the OFDMA scheduling device 118 may experience a collision on the network and wait for a fixed amount of time before attempting to retransmit. Such random backoff 504 minimizes the probability that the same nodes will collide again. Upon receiving the high-efficiency signal (HE-SIG-B) header, the wireless devices 116 learn which RUs are assigned to them, and if there is a transmission assigned for them. The STAs wait for a short inter-frame spacing (SIFS) duration 510 at the end of the data transmission and participate in the MU-ACK (acknowledgment) action based on their ACK policy. In the MU-ACK action, each STA that is required to send an ACK frame 514 sends the ACK frame 514 through the RU 508 allocated for its ACK frame 514 transmission in the uplink (UL) direction. The trigger frame 506 and the RU allocation 508 may be separated by a short inter-frame spacing (SIFS) duration 516.

Figure 6A:
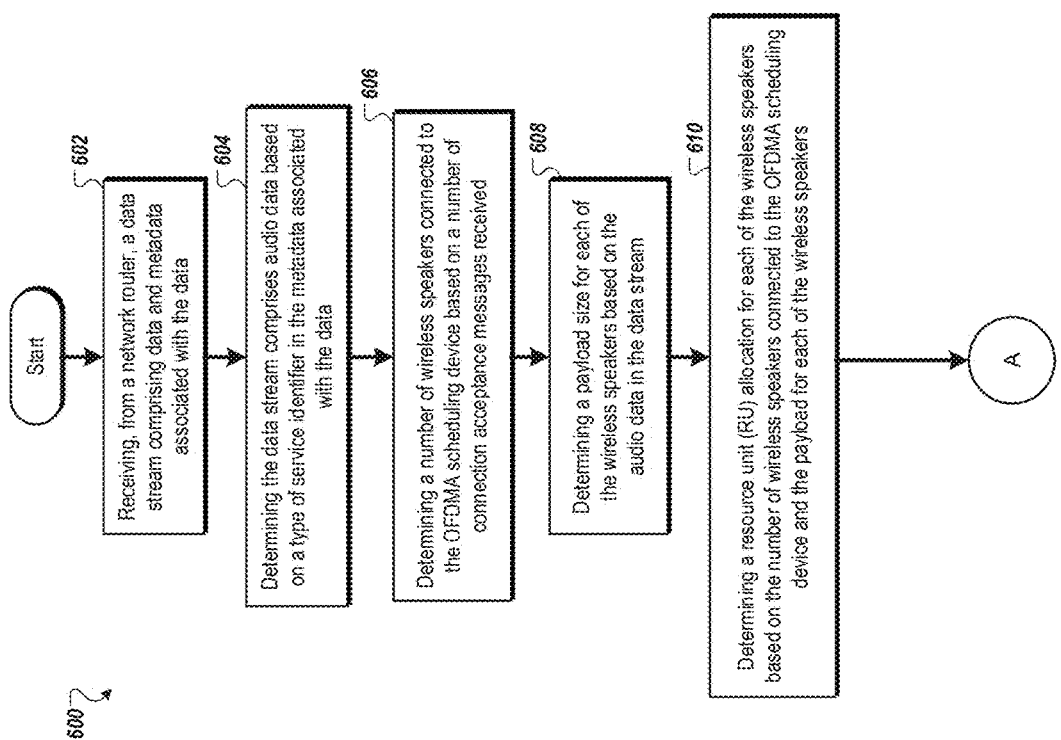
FIGS. 6A and 6B show a flow diagram of a method for scheduling OFDMA frames in an OFDMA system according to one embodiment.

FIG. 6A is a flow diagram of a method 600 for scheduling OFDMA frames in an OFDMA system according to one embodiment. At operation 602, the processing logic of the OFDMA scheduling device may receive a data stream including one or more data bits and metadata associated with the data bits. In one embodiment, the data stream may include audio packets. For example, a user may be streaming a video from a streaming service, such as Prime Video®, and the video may include high-fidelity Dolby Atmos® sound. In one example, the audio packets may be separated from each other by a fixed time interval (e.g., 32 ms or less). The processing logic of the OFDMA scheduling device may be able to identify audio data, including audio packets based on a traffic identifier (e.g., a type of service identifier) included in the metadata of the data stream. At operation 606, prior to receiving a connection acceptance message from the wireless devices, the processing logic of the OFDMA scheduling device may send a connection request message to each of the wireless devices. The wireless devices may respond with a connection acceptance message which is received by the processing logic of the OFDMA scheduling device. Based on the number of connection acceptance messages received by the processing logic of the OFDMA scheduling device, it determines the number of wireless devices connected to it. At operation 608, the processing logic of the OFDMA scheduling device may determine a payload size for each of the wireless devices based on the audio data in the data stream. Based on the number of wireless devices connected to it and the payload of each of the devices, the processing logic of the OFDMA scheduling device determines a resource unit (RU) allocation for each of the wireless devices, at operation 610.

Figure 6B:
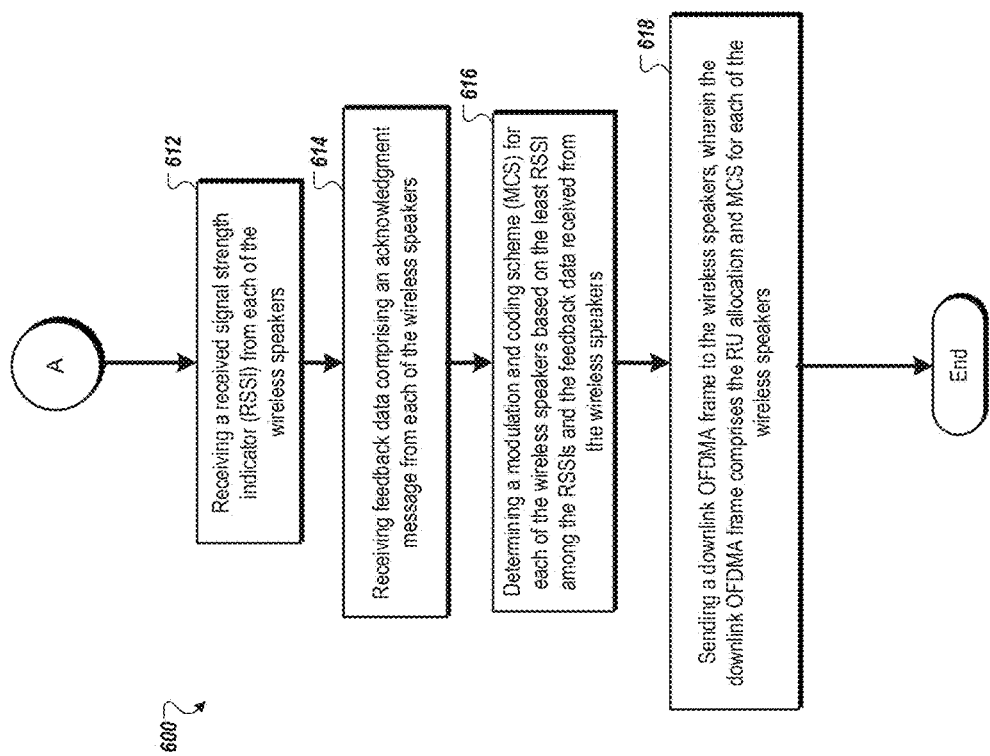

FIG. 6B illustrated additional steps in a method 600 for scheduling OFDMA frames in an OFDMA system according to one embodiment. At operation 612, the processing logic of the OFDMA scheduling device receives a received signal strength indicator (RSSI) value from each of the wireless devices connected to it. At operation 614, when the connection between the OFDMA scheduling device and the one or more wireless devices (e.g., wireless speakers) is established, the OFDMA scheduling device may receive feedback (e.g., an acknowledgment (ACK) message) acknowledging the receipt of one or more data frames by the one or more wireless devices. At operation 616, the processing logic of the OFDMA scheduling device may determine a modulation and coding scheme (MCS) for each of the wireless devices based on the least RSSI value among the RSSI values and the feedback data received from the wireless devices. At operation 618, the processing logic of the OFDMA scheduling device may send a downlink OFDMA frame to the wireless devices. The downlink OFDMA frame may include the RU allocation and MCS for each of the wireless devices such that the wireless devices learn which RUs are assigned to them to receive data, and if there is a transmission assigned for them.

Figure 7:
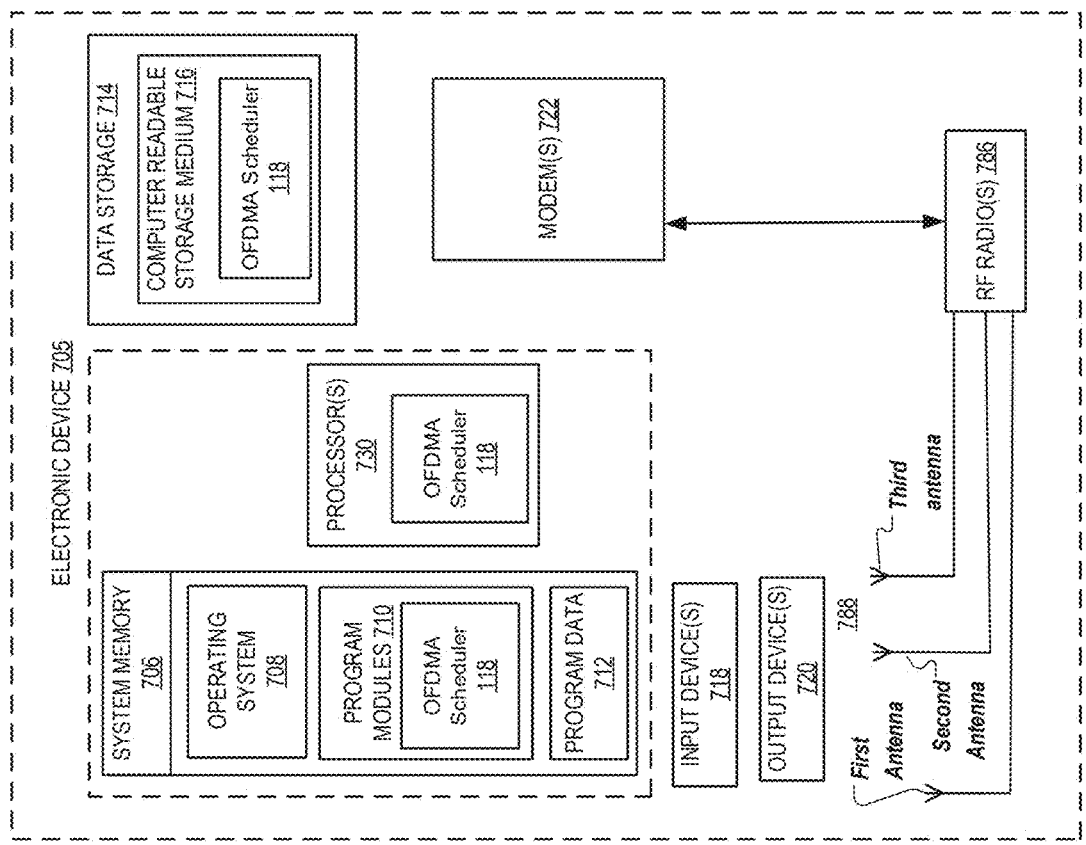
FIG. 7 is a block diagram of an electronic device in which embodiments of a low-weight OFDMA scheduling device may be implemented.

FIG. 7 is a block diagram of an electronic device 705 in which embodiments of an OFDMA scheduling device 118 may be implemented. The electronic device 705 may correspond to the OFDMA scheduling device of FIGS. 1, 2, and 4. The electronic device 705 may be any type of computing devices such as voice control and speaker devices, televisions, television set-top boxes, television dongles, an electronic book reader, a PDA, a mobile phone, a laptop computer, a portable media player, a tablet computer, a camera, a video camera, a netbook, a desktop computer, a gaming console, a DVD player, Blu-ray® player, a computing pad, a media center, an audio-input-enabled device, a speech-based personal data assistant, or the like. The electronic device 705 may be any portable or stationary user device. For example, the electronic device 705 may be an intelligent voice control and speaker system. Alternatively, the electronic device 705 can be any other device used in a WLAN network (e.g., Wi-Fi® network), a WAN network, or the like.

The electronic device 705 includes one or more processor(s) 730, such as one or more CPUs, microcontrollers, field programmable gate arrays, or other types of processing devices. The electronic device 705 also includes system memory 706, which may correspond to any combination of volatile and/or non-volatile storage mechanisms. The system memory 706 stores information that provides operating system component 708, various program modules 710, such as the OFDMA scheduling device 118 described herein, program data 712, and/or other components. In one embodiment, the system memory 706 stores instructions of the methods as described herein. The electronic device 705 performs functions by using the processor(s) 730 to execute instructions provided by the system memory 706.

The electronic device 705 also includes a data storage device 714 that may be composed of one or more types of removable storage and/or one or more types of non-removable storage. The data storage device 714 includes a computer-readable storage medium 716 on which is stored one or more sets of instructions embodying any of the methodologies or functions described herein, such as the OFDMA scheduling device 118 described herein. Instructions for the program modules 710 may reside, completely or at least partially, within the computer-readable storage medium 716, system memory 706 and/or within the processor(s) 730 during execution thereof by the electronic device 705, the system memory 706 and the processor(s) 730 also constituting computer-readable media. The electronic device 705 may also include one or more input devices 718 (keyboard, mouse device, specialized selection keys, etc.) and one or more output devices 720 (displays, printers, audio output mechanisms, etc.).

The electronic device 705 further includes a modem 722 to allow the electronic device 705 to communicate via a wireless network (e.g., such as provided by the wireless communication system) with other computing devices, such as remote computers, an item-providing system, and so forth. The modem 722 can be connected to one or more radios 786. The radios may include a WLAN radio, a WAN radio, a PAN radio, or the like, as described herein. Antennas 788 are coupled to the radios 786, which are coupled to the modem 722. The antennas 788 may include one or more WLAN antennas, one or more PAN antennas, or the like. Additional antennas may be used and may be GPS antennas, NFC antennas, other WAN antennas, or the like. The modem 722 allows the electronic device 705 to handle both voice and non-voice communications (such as communications for text messages, multimedia messages, media downloads, web browsing, etc.) with a wireless communication system. The modem 722 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 722 may generate signals and send these signals to antennas 788, via RF radio(s) 786 as described herein. Electronic device 705 may additionally include a WLAN radio, a GPS receiver, a PAN transceiver, and/or other RF radios. These RF radios may additionally or alternatively be connected to one or more antennas 788.

Antennas 788 may be configured to transmit in different frequency bands and/or using different wireless communication protocols. The antennas 788 may be directional, omnidirectional, or non-directional antennas. In addition to sending data, antennas 788 may also receive data, which is sent to appropriate RF radios connected to the antennas.

In one embodiment, the electronic device 705 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna structure that operates at a first frequency band, and the second wireless connection is associated with a second resonant mode of the antenna structure that operates at a second frequency band. In another embodiment, the first wireless connection is associated with a first antenna element, and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 722 is shown to control transmission and reception via the antenna (788), the electronic device 705 may alternatively include multiple modems, each of which is configured to transmit/receive data via a different antenna and/or wireless transmission protocol.

The electronic device 705 delivers and/or receives items, upgrades, and/or other information via the network. For example, the electronic device 705 may download or receive items from an item-providing system. The item-providing system receives various requests, instructions, and other data from the electronic device 705 via the network. The item-providing system may include one or more machines (e.g., one or more server computer systems, routers, gateways, etc.) that have processing and storage capabilities to provide the above functionality. Communication between the item-providing system and the electronic device 705 may be enabled via any communication infrastructure. One example of such an infrastructure includes a combination of a wide area network (WAN) and wireless infrastructure, which allows a user to use the electronic device 705 to purchase items and consume items without being tethered to the item-providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by products using the Wi-Fi® technology based on IEEE 802.11x standards by Wi-Fi Alliance. Another one of the wireless communication systems may be a wireless carrier system that can be implemented using various data processing equipment, communication towers, etc. Alternatively, or in addition, the wireless carrier system may rely on satellite technology to exchange information with the electronic device 705.

The communication infrastructure may also include a communication-enabling system that serves as an intermediary in passing information between the item-providing system and the wireless communication system. The communication-enabling system may communicate with the wireless communication system (e.g., a wireless carrier) via a dedicated channel and may communicate with the item-providing system via a non-dedicated communication mechanism, e.g., a public Wide Area Network (WAN) such as the Internet.

The electronic devices are variously configured with different functionality to enable the consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The electronic devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution or implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions, when executed by the circuitry in a device, may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An orthogonal frequency division multiple access (OFDMA) scheduling device comprising:
a memory storing instructions executable by one or more processors to perform operations comprising:
receiving, from a network router, a data stream comprising data and metadata associated with the data;
determining that the data stream comprises audio data based on a traffic identifier in the metadata;
determining a number of wireless speakers coupled to the OFDMA scheduling device;
determining a payload size for each of the wireless speakers based on the audio data in the data stream;
determining a resource unit (RU) allocation for each of the wireless speakers based on the number of wireless speakers coupled to the OFDMA scheduling device and the payload size for each of the wireless speakers;
receiving a received signal strength indicator (RSSI) value from each of the wireless speakers;
determining a modulation and coding scheme (MCS) for each of the wireless speakers based on a smallest RSSI value among the RSSI values; and
sending a downlink OFDMA frame to the wireless speakers, wherein the downlink OFDMA frame comprises the RU allocation and the MCS for each of the wireless speakers.

2. The OFDMA scheduling device of claim 1, wherein the downlink OFDMA frame further comprises a physical header comprising a high-efficiency signal (HE-SIG-B) symbol, wherein the high-efficiency signal (HE-SIG-B) symbol comprises a downlink (DL) schedule and the resource unit (RU) allocation.

3. The OFDMA scheduling device of claim 1, wherein the downlink OFDMA frame further comprises a group of tones assigned to each of the wireless speakers based on the RU allocation.

4. An orthogonal frequency division multiple access (OFDMA) scheduling device comprising:
a memory storing instructions executable by one or more processors to perform operations comprising:
receiving a data stream comprising data and metadata associated with the data;
determining that the data stream comprises audio data based on a traffic identifier in the metadata associated with the data;
determining a number of wireless devices coupled to the OFDMA scheduling device based on a number of connection acceptance messages received;

determining a payload size for each of the wireless devices based on the data stream; and determining a resource unit (RU) allocation for each of the wireless devices based on the number of wireless devices coupled to the OFDMA scheduling device and the payload size for each of the wireless devices.

5. The OFDMA scheduling device of claim 4, wherein the operations further comprise:

receiving a received signal strength indicator (RSSI) value from each of the wireless devices;

receiving feedback data comprising an acknowledgment message from each of the wireless devices; and determining a modulation and coding scheme (MCS) for each of the wireless devices based on a smallest RSSI value among the RSSI values and the feedback data received from the wireless devices.

6. The OFDMA scheduling device of claim 5, wherein the operations further comprise:

sending a downlink OFDMA frame to the wireless devices, wherein the downlink OFDMA frame comprises the RU allocation and the MCS for each of the wireless devices.

7. The OFDMA scheduling device of claim 6, wherein the downlink OFDMA frame further comprises a physical header comprising a high-efficiency signal (HE-SIG-B) symbol, wherein the high-efficiency signal (HE-SIG-B) symbol comprises a downlink (DL) schedule and the resource unit (RU) allocation.

8. The OFDMA scheduling device of claim 7, wherein the downlink OFDMA frame further comprises a group of tones assigned to each of the wireless devices based on the RU allocation.

9. A method comprising:

receiving, by a processor in an OFDMA scheduling device, a data stream comprising data and metadata associated with the data;

determining that the data stream comprises audio data based on a traffic identifier in the metadata associated with the data;

determining a number of wireless devices coupled to the OFDMA scheduling device based on a number of connection acceptance messages received;

determining a payload size for each of the wireless devices based on the data stream; and determining a resource unit (RU) allocation for each of the wireless devices based on the number of wireless devices coupled to the OFDMA scheduling device and the payload size for each of the wireless devices.

10. The method of claim 9, further comprising:

receiving a received signal strength indicator (RSSI) value from each of the wireless devices;

receiving feedback data comprising an acknowledgment message from each of the wireless devices; and determining a modulation and coding scheme (MCS) for each of the wireless devices based on a smallest RSSI value among the RSSI values and the feedback data received from the wireless devices.

11. The method of claim 10, further comprising:

sending a downlink OFDMA frame to the wireless devices, wherein the downlink OFDMA frame comprises the RU allocation and the MCS for each of the wireless devices.

12. The method of claim 11, wherein the downlink OFDMA frame further comprises a physical header comprising a high-efficiency signal (HE-SIG-B) symbol, wherein the high-efficiency signal (HE-SIG-B) symbol comprises a downlink (DL) schedule and the resource unit (RU) allocation.

13. The method of claim 11, wherein the downlink OFDMA frame further comprises a group of tones assigned to each of the wireless devices based on the RU allocation.

14. The method of claim 13, wherein the group of tones comprises at least one of 26-, 52-, 106-, 242-, 484-, and 996-tones.

15. A method comprising:

receiving, at a processor in an orthogonal frequency division multiple access (OFDMA) scheduling device from a network router, a data stream comprising data and metadata associated with the data;

determining that the data stream comprises audio data based on a traffic identifier in the metadata;

determining a number of wireless speakers coupled to the OFDMA scheduling device;

determining a payload size for each of the wireless speakers based on the audio data in the data stream;

determining a resource unit (RU) allocation for each of the wireless speakers based on the number of wireless speakers coupled to the OFDMA scheduling device and the payload size for each of the wireless speakers;

receiving a received signal strength indicator (RSSI) value from each of the wireless speakers;

determining a modulation and coding scheme (MCS) for each of the wireless speakers based on a smallest RSSI value among the RSSI values; and sending a downlink OFDMA frame to the wireless speakers, wherein the downlink OFDMA frame comprises the RU allocation and the MCS for each of the wireless speakers.

16. The method of claim 15, wherein the downlink OFDMA frame further comprises a physical header comprising a high-efficiency signal (HE-SIG-B) symbol, wherein the high-efficiency signal (HE-SIG-B) symbol comprises a downlink (DL) schedule and the resource unit (RU) allocation.

17. The method of claim 15, wherein the downlink OFDMA frame further comprises a group of tones assigned to each of the wireless speakers based on the RU allocation.

18. The method of claim 17, wherein the group of tones comprises at least one of 26-, 52-, 106-, 242-, 484-, and 996-tones.

* * * * *